3,148,135
HYDROCONVERSION OF HYDROCARBONS IN TWO STAGES
Warren G. Schlinger, Pasadena, Calif., and Du Bois Eastman, deceased, late of Whittier, Calif., by Security First National Bank, executor, Los Angeles, Calif., assignors to Texaco Inc., New York, N.Y., a corporation of Delaware
Filed July 25, 1961, Ser. No. 130,217
17 Claims. (Cl. 208—58)

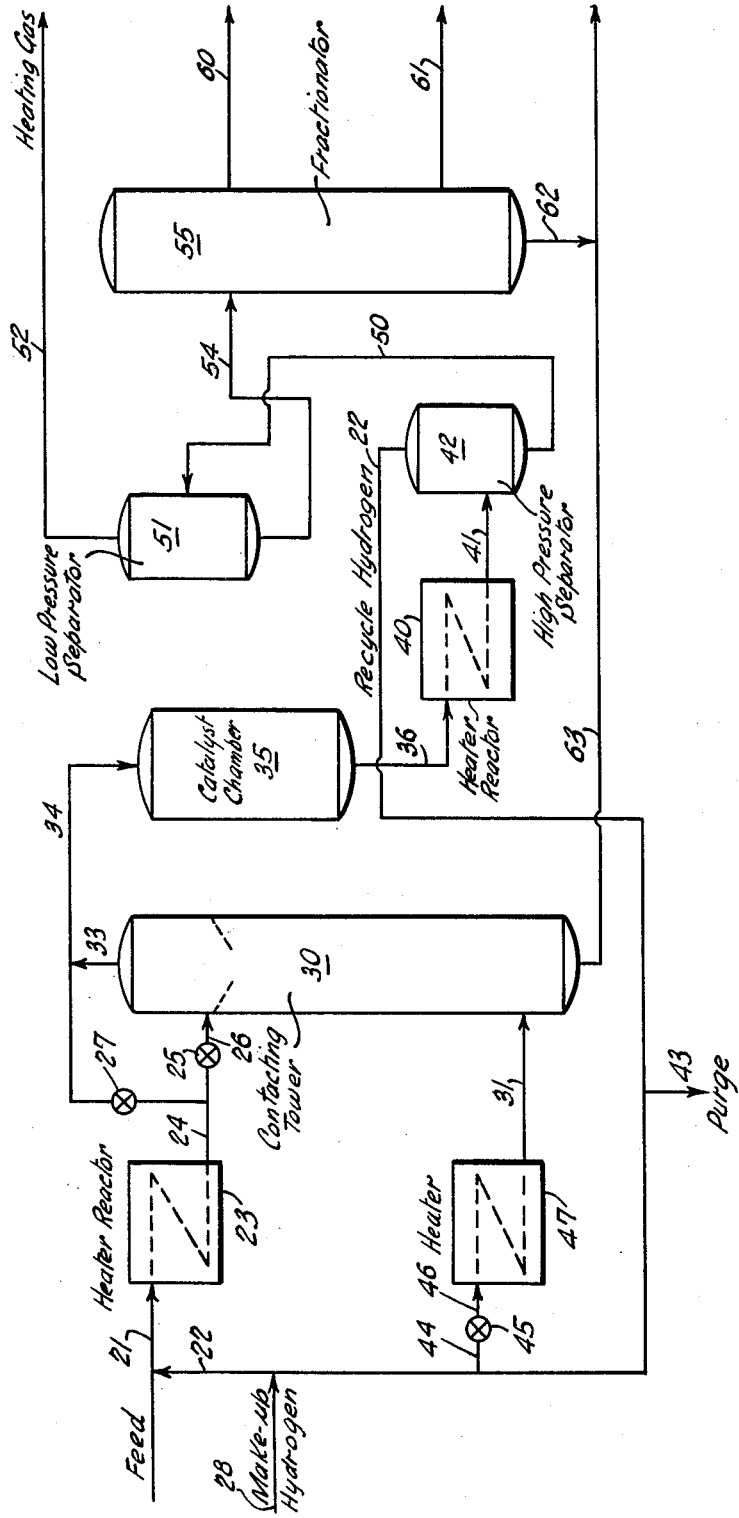

This invention relates to the hydroconversion of hydrocarbons. More particularly it relates to the conversion of hydrocarbon liquids into valubale products, particularly fuel gases and high octane motor fuel.

In the hydroconversion processes of the prior art the yields of desirable lighter products have been unsatisfactory whereas yields of undesirable products such as high polymers and coke have been uneconomically high. The destructive or splitting type of conversion can be likened to viscosity breaking, a mild thermal process generally carried out at temperatures of about 935° F. and pressures of about 50 p.s.i.g. Deeper conversion by thermal cracking results in the formation of large amounts of high polymers and coke. In these latter instances hydrogen has been added to the thermal cracking processes in an attempt to suppress the formation of these undesirable materials. However even with the presence of hydrogen, prior art hydroconversion processes have still produced large amounts of high polymers and coke.

Apparently even when hydrogen is added it does not reach the site of the reaction in sufficient amounts to react with the active fragments produced by the cracking and as a result the active fragments interreact to form polymers. When deeper conversion is attempted at higher temperatures it has been the practice to increase the hydrogen concentration in the reaction zone. However the increased hydrogen concentration has not rendered prior hydroconversion processes satisfactory because as the temperature is increased the rate of cracking increases more rapidly than does the rate of solution or diffusion of the hydrogen into the hydrocarbon and consequently even at higher hydrogen concentrations the cracking reaction proceeds more rapidly than the hydrogen can dissolve or diffuse to the reaction site to react with the active fragments of cracking. As a result although the overall concentration of the hydrogen in the reaction zone may be high there are many areas in the reaction zone where there is a local deficiency of hydrogen either because the hydrogen has never reached that particular area or because it has been consumed but not replaced and consequently the formation of polymers is not prevented in the hydroconversion processes of the prior art.

In the hydroconversion process of the present invention a hydrocarbon liquid in intimate mixture with hydrogen is passed through a first tubular reaction zone at elevated temperatures and pressures and under conditions of highly turbulent flow, at least a portion of the first reaction zone effluent is passed into contact with a hydrogenation catalyst, the effluent from the catalytic reaction zone is passed through a second tubular reaction zone under conditions of highly turbulent flow and the second reaction zone effluent is separated into the desired products such as fuel gas and a high octane motor fuel.

Any hydrocarbon liquid may be successfully subjected to hydroconversion by the process of the present invention. Crudes ranging from light crudes, such as Arabian, to heavy crudes, such as San Ardo, or any portion thereof such as naphtha, kerosene, diesel oil, gas oil or mixtures or portions thereof are suitable feedstocks for the process. The feedstock together with hydrogen is passed through a first reaction zone under conditions of highly turbulent flow at elevated temperatures and pressures. The first reaction zone is elongated and tubular in shape and is maintained at a temperature between 700 and 1400° F. preferably between about 800 and 1100° F. The reaction zone is also maintained at superatmospheric pressures ranging from about 500 to 20,000 p.s.i.g. or higher although pressures of from about 1000 to 10,000 p.s.i.g. have been found satisfactory. Hydrogen rates of between 1000 and 1,000,000 cu. ft./bbl. of feed may be employed although rates of at least 2000 and preferably at least 5,000 cu. ft./bbl. are desirable. Advantageously the hydrogen should have relatively high purity as for example at least 70 volume percent but successful operations may be conducted using a gas having a hydrogen concentration as low as 25 volume percent.

Hydrocarbon feed rate, hydrogen recycle rate, reaction coil diameter and operating conditions of temperature and pressure all tend to affect the velocity of the reactant flow and the turbulence. The turbulence is conveniently expressed in terms of the ratio of the average apparent viscosity of the flowing stream $\overline{\epsilon_m}$ to the molecular or kinematic viscosity $\nu$ and to refer to this ratio $\overline{\epsilon_m}/\nu$ as turbulence level. The apparent viscosity of the flowing stream $\epsilon_m$ equals the sum of the eddy viscosity $\epsilon_m$ and the kinematic viscosity $\nu$ which may be shown by the expression $\epsilon_{m'} = \epsilon_m + \nu$. Under conditions of turbulence $\epsilon_m$ has a finite value and it is apparent that if the magnitude of the apparent viscosity exceeds the kinematic viscosity at the point in question the ratio of $\epsilon_m/\nu$ exceeds unity. For a given turbulent system it follows that the average value of the ratio as expressed by $\overline{\epsilon_m}/\nu$ exceeds unity. The average apparent viscosity $\overline{\epsilon_m}$ as employed herein is defined by the equaiton $$\overline{\epsilon}_m = \frac{1}{r_0}\int_0^{r_0} \epsilon_m dr$$

where $r_0$ is the radius of the conduit and $r$ is the distance in feet from the center of the conduit. By substitution and integration employing the parameters described by Corcoran et al. in Industrial and Engineering Chemistry, volume 44, page 410 (1952), this expression $$\overline{\epsilon}_m = \frac{1}{r_0}\int_0^{r_0} \epsilon_m dr$$

may be rewritten $$\overline{\epsilon}_m = \frac{r_0}{15}\sqrt{\frac{r_0 g}{2\sigma}\cdot\frac{dp}{dx}}$$

The latter equation is in terms which may be readily determined for a given system.

*Nomenclature*

$d$ = Differential
$g$ = Acceleration of gravity ft./sec./sec.
$p$ = Pressure, pounds/sq. ft.
$r_0$ = Radius of conduit in ft.
$r$ = Distance, ft.
$\epsilon_m$ = Eddy viscosity, sq. ft./sec.
$\epsilon_{m'}$ = Apparent viscosity, sq. ft./sec.
$\overline{\epsilon_m}$ = Average apparent viscosity, sq. ft./sec.
$\nu$ = Kinematic viscosity, sq. ft./sec.
$\sigma$ = Specific weight, lbs./cu. ft.
$x$ = Distance, ft.

To prevent plugging of the tubular reactor, turbulence levels of at least 25 are employed but turbulence levels of from 50 to 1,000 are preferred.

The effluent from the first reaction zone or a portion thereof is then passed into contact with a hydrogenation catalyst. When the original feedstock is a crude or a topped crude and contains more than about 1% Conradson carbon the effluent from the first reaction zone is advantageously treated to remove any tar or asphaltic materials. If, however, the original feedstock is a distillate material or a clean stock, then the effluent from the first reaction zone may be passed into contact with the hydrogenation catalyst without any intermediate treatment.

Hydrogenation catalysts used in the catalytic zone suitably comprise the oxides and/or sulfides of Group VI or Group VIII metals and mixtures thereof such as, for example, molybdenum oxide, molybdenum sulfide, nickel sulfide, nickel tungsten sulfide, nickel molybdenum sulfide, nickel molybdenum oxide, cobalt molybdenum oxide, cobalt molybdenum sulfide, cobalt nickel molybdenum oxide or sulfide and mixtures thereof. The catalyst may be used alone or may be carried on a substantially inert support. Temperatures in the catalytic treating zone range between about 600 and 950° F. and pressures range between about 500 and 2,000 p.s.i.g. or higher. Space velocities of from 0.1 to 10 volumes of liquid hydrocarbon per hour per volume of catalyst may be used although space velocities of 0.5 to 5 are preferred. Sufficient hydrogen is present in the effluent from the first reaction zone to maintain a satisfactory hydrogen partial pressure during the catalytic treatment. This catalytic hydrogenation converts the chemically combined sulfur and nitrogen present to $H_2S$ and $NH_3$. The catalytic hydrogenation also to a great extent serves to saturate the unsaturated material present in the product of the first non-catalytic reaction zone, thus making it more susceptible to conversion in the second non-catalytic reaction zone.

The entire effluent from the catalytic treatment or a selected portion thereof is then transferred to a second elongated tubular reaction zone. If for example it is desired to produce a high quality kerosene or diesel oil, the effluent from the catalytic treatment may be fractionated and all, or a portion of the kerosene and diesel oil withdrawn from the system, at this point, the balance being sent to the second tubular reaction zone. Conditions of turbulence and pressure are generally in the same range as those of the first non-catalytic reaction zone. However, temperatures in the second non-catalytic tubular reaction zone range from about 800 to 1500° F. preferably 900–1200° F.

It is also possible, when the original feed boils over a wide range as for example from naphtha to gas oil and higher to separate the feed into a light fraction containing lighter fractions such as naphtha and kerosene and a heavy fraction and to combine the light fraction with the reactant stream just prior to the introduction of the latter into the second elongated tubular reaction zone. As an alternative, the light fraction can be introduced into the reactant stream just prior to the catalytic reaction zone.

Effluent from the second non-catalytic reaction zone is then separated into a gas rich in hydrogen which is recycled to either the first or second non-catalytic zone or is used in a tar and asphalt removal step to be described below. As the gas rich in hydrogen contains a considerable amount of gaseous hydrocarbons the hydrogen content of the gas can be increased and the hydrocarbons simultaneously removed by passing the gas, with oxygen, to a gas generator where it is subjected to partial combustion to produce a gas containing carbon monoxide and hydrogen. This product gas is subjected to a water gas shift reaction whereby the carbon monoxide reacts with added steam to form carbon dioxide and hydrogen. Removal of the carbon dioxide by scrubbing or the like results in a gas of approximately 98% hydrogen purity.

After removal of the gas rich in hydrogen, the balance of the effluent from the second non-catalytic reaction zone is then separated into a normally gaseous hydrocarbon fraction suitable for use as a fuel or heating gas, and, depending on the selected mode of operation motor fuel and heavier materials. For example, if kerosene and heavier materials have been removed from the effluent from the catalytic zone, the effluent from the second non-catalytic zone will be composed of naphtha and lighter materials. The normally gaseous hydrocarbon fraction has a high heating value generally in the range of from 1500 to 2000 B.t.u. per cubic foot and may be used directly as a fuel or may be diluted with inert gases or gases of lower heating value to provide a gas of predetermined heating value suitable for distribution in municipal gas systems. Because of its high aromatic content the normally liquid product boiling in the motor fuel range has a high octane number.

As mentioned above, when the original feed is a whole crude, a topped crude or a hydrocarbon fraction containing at least 1% Conradson carbon, the effluent from the first elongated non-catalytic reaction zone is advantageously treated to remove heavy materials such as asphalt and tar. Under these circumstances, the reaction mixture in the first reaction zone is composed of two phases, a gaseous phase and a liquid phase which latter because of the extremely high turbulence in the reaction zone is in the form of fine mist-like droplets suspended in the gaseous phase. Removal of the tar and asphalt-like heavy materials is preferably accomplished by passing the effluent into a separation zone and allowing the liquid material to separate from the gaseous material which is removed overhead from the separation zone. The liquid material descends through a contacting zone and is countercurrently contacted with a stream of hot hydrogen such as the recycle gas in an amount ranging between 5000 and 50,000 preferably between 5000 and 20,000 s.c.f./bbl. of original feed which effects some additional hydroconversion of the hydrocarbon liquids present and also serves to remove occluded vaporous hydrocarbons. The unreacted hydrogen and vaporous hydrocarbons formed and/or freed in the contracting zone are combined with the gaseous phase removed overhead from the separating zone and the combined stream is introduced into contact with the hydrogenation catalyst. The residual liquid hydrocarbons are removed from the bottom of the contacting zone.

For a better understanding of the invention, reference is now made to the accompanying drawing which illustrates diagrammatically a flow scheme for the practice of the present invention and in connection with which a specific example is described. It should be understood that the example is given for illustrative purposes only and is not to be construed as limiting the invention in any manner.

Referring now to the drawing, Arabian crude is introduced into the system through line 21 and, together with hydrogen of 86% purity introduced through line 22 at the rate of 5,000 cubic feet/barrel of feed, is passed into reactor 23 which is maintained at a temperature of 880° F., a pressure of 1500 p.s.i.g. and a turbulence level of 140. With valve 27 closed and valve 25 open, effluent from reactor 23 passes through lines 24 and 26 to the upper section of contacting tower 30 which serves as a disengaging zone to separate the effluent from reactor 23 into a gaseous portion and a liquid portion. The separated liquid portion descends through contacting tower 30 and countercurrently meets upwardly-flowing hot hydrogen introduced at a rate of 8000 cubic feet/barrel of crude feed through line 31. Contact with the hot hydrogen which has been separately heated to a temperature of about 900° F. serves to convert some of the liquid hydrocarbons to gaseous hydrocarbons and also serves to disengage some occluded vaporous hydrocarbons carried downwardly through the contacting tower with the liquid. The upwardly flowing mixture of hydrogen and vaporous hydrocarbons is combined with the gaseous phase of the effluent from reactor 23 and is withdrawn from contacting tower 30 through line 33. The mixture of hydrogen and vaporous hydrocarbons is transferred through line 34 to catalyst chamber 35 through which it passes at a temperature of 890° F., a pressure of 1400 p.s.i.g. and a space velocity of 2 volumes of liquid feed per volume of catalyst per hour. Effluent from catalyst chamber 35 is then transferred through line 36 to reactor 40 where it is subjected to conversion conditions including a temperature of 1000° F., a pressure of 1350 p.s.i.g. and a turbulence level of 190. The conversion products and unreacted hydrogen then flow from reactor 40 through line 41 to high pressure separator 42 operated at 1300 p.s.i.g. from which a gas rich in hydrogen is removed through line 22. To prevent the buildup of undesirable gases such as $H_2S$ and $NH_3$, a portion of this gas is removed from the system through line 43. Of the balance of the recycle gas, 8,000 s.c.f. per barrel of crude feed is sent through line 44, valve 45 and line 46 to heater 47 and then through line 31 to the lower portion of contacting tower 30. The balance of the recycle hydrogen, with sufficient makeup hydrogen added through line 28 to provide 5000 s.c.f. per barrel of feed, is introduced into line 21 where it is combined with the feed.

Bottoms from high pressure separator 42 pass through line 50 to low pressure separator 51 operated at about 450 p.s.i.g. from which a normally vaporous hydrocarbon fraction is removed through line 52. This gas, obtained at a rate of about 750 s.c.f./bbl. of feed, consists for the most part of methane, ethane and propane, has a heating value of 1800 B.t.u. per cubic foot and may be used as is as a fuel or may be diluted with hydrogen, nitrogen or $CO_2$ to provide a fuel suitable for distribution in municipal gas systems. This gas after the removal of methane is also suitable for use as feed for the production of low molecular weight olefins such as ethylene and propylene.

The normally liquid hydrocarbon portion of the reaction product is removed from low pressure separator 51 through line 54 and is introduced into fractionator 55 wherein it may be fractionated into a naphtha obtained at a rate of 48 bbl. per 100 bbl. of crude feed withdrawn through line 60 and kerosene and diesel oil withdrawn through line 61. Heavier material withdrawn through line 62 is advantageously combined with the tar and asphalt bottoms removed from contacting tower 30 through line 63 to facilitate the handling and transportation of the contacting tower bottoms. The naphtha withdrawn through line 60 has a clear ASTM Research Octane Number of 90 and may be further upgraded by catalytic reforming.

Various modifications may be made in the foregoing disclosure without departing from the spirit of the invention. For example, when the feed is a clean stock such as a distillate stock, valves 45 and 25 are closed and valve 27 is opened, thus permitting the effluent from reactor 23 to bypass contacting tower 30 and go directly from reactor 23 to catalyst chamber 35. Makeup hydrogen is added as necessary through line 28.

In another modification, any portion of the product may be subjected to partial combustion to produce a gas containing hydrogen. The hydrogen so produced can be used for additional hydroconversion. Advantageously, the bottoms from contacting tower 30 can be subjected to partial combustion to produce a gas containing CO and $H_2$. This gas can be subjected to shift conversion to produce a shifted gas containing $CO_2$ and $H_2$. The shifted gas may be used to dilute the normally gaseous hydroconversion product. Alternatively a portion or all of the hydrogen may be removed from the shifted gas and the balance used for dilution of the normally gaseous hydroconversion product.

In still another modification the crude feedstock may be subjected to a preliminary fractionation to separate naphtha, kerosene and other normally liquid fractions boiling below about 600° F. The residue, that is the material boiling above about 600° F., would be fed with hydrogen into the initial non-catalytic heater-reactor and then into the contacting tower. If low molecular weight olefins are one of the desired products the separated naphtha may be combined with the gaseous material removed from the low pressure separator and the mixture subjected to a pyrolysis reaction for conversion into low molecular weight olefins such as ethylene, propylene and butylene. The distillate kerosene and heavier material separated from the crude can be combined with the overhead from the contacting tower and the mixture introduced into the catalyst chamber. However, if motor fuel or LPG is to be one of the main products the naphtha may also be introduced into the overhead from the contacting tower.

The yield of light products such as gaseous hydrocarbons, or naphtha may be increased by recycling product liquid boiling above the desired materials to the second non-catalytic elongated reaction zone.

Various other modifications will be obvious to those skilled in the art without departing from the spirit and scope of the invention and therefore only such limitations should be imposed as are indicated in the appended claims.

We claim:

1. A process for the hydroconversion of a hydrocarbon liquid which comprises passing said liquid under conditions of highly turbulent flow through a first elongated reaction zone at a temperature between 700° F. and 1400° F. and a pressure of at least 500 p.s.i.g. in the presence of added hydrogen, passing at least a portion of the effluent from said first reaction zone into contact with a hydrogenation catalyst under hydrogenation conditions including a temperature between 600° F. and 950° F., a pressure between about 500 and 2,000 p.s.i.g. and at a space velocity between 0.1 and 10 liquid volumes of hydrocarbon per hour per volume of catalyst, passing at least a portion of the hydrocarbon effluent from the catalytic zone in the presence of hydrogen under conditions of highly turbulent flow through a second elongated reaction zone at a temperature between 800° F. and 1500° F. and a pressure of at least 500 p.s.i.g. and recovering the products of hydroconversion from the effluent from said second elongated reaction zone.

2. The process of claim 1 in which the turbulence level in each elongated reaction zone is at least 25.

3. The process of claim 1 in which the turbulence level in each reaction zone is between 50 and 1000.

4. The process of claim 1 in which the hydrogenation catalyst comprises a compound of molybdenum.

5. The process of claim 1 in which the hydrogenation catalyst comprises a compound of nickel.

6. The process of claim 1 in which the hydrocarbon liquid starting material is a distillate stock and the effluent from the first reaction zone is passed directly and without intermediate treatment to the catalytic zone.

7. A process for the hydroconversion of a hydrocarbon liquid which comprises passing said hydrocarbon liquid under conditions of highly turbulent flow through a first elongated reaction zone at a temperature between 700° F. and 1400° F. and a pressure of at least 500 p.s.i.g. in the presence of added hydrogen, separating the effluent from said first reaction zone into a gaseous portion comprising hydrogen and vaporous hydrocarbons and a liquid portion comprising unvaporized hydrocarbons, contacting said gaseous portion with a hydrogenation catalyst at a temperature between 600° F. and 950° F. and a pressure between about 500 and 2,000 p.s.i.g. and a space velocity between 0.1 and 10 liquid volumes of hydrocarbon per hour per volume of catalyst, passing at least a portion of the hydrocarbon effluent from the catalytic zone in the presence of hydrogen under conditions of highly turbulent flow through a second elongated reaction zone at a temperature between 800° F. and 1500° F. and a pressure of at least 500 p.s.i.g. and recovering hydroconversion products from the effluent from said second elongated reaction zone.

8. The process of claim 7 in which the liquid portion is countercurrently contacted with a separately heated stream of hydrogen.

9. The process of claim 8 in which unreacted separately heated hydrogen and vaporous hydrocarbons formed during the contacting are combined with said gaseous portion.

10. The process of claim 9 in which the residual liquid portion after contact with hydrogen is subjected to partial combustion to produce a gas containing hydrogen.

11. A process for the hydroconversion of a hydrocarbon liquid which comprises passing said liquid under conditions of highly turbulent flow through a first elongated reaction zone at a temperature between about 800° F and 1100° F., a pressure between about 1,000 and 10,000 p.s.i.g. in the presence of from 2000 to 20,000 cubic feet of hydrogen per barrel of feed, passing at least a portion of the effluent from said first reaction zone into contact with a hydrogenation catalyst under hydrogenation conditions including a temperature between 600° F. and 950° F. and at a space velocity between about 0.5 and 5 liquid volumes of feed per hour per volume of catalyst, passing at least a portion of the hydrocarbon effluent from the catalytic zone in the presence of hydrogen under conditions of highly turbulent flow through a second elongated reaction zone at a temperature between 900° F. and 1200° F. and a pressure between about 1,000 and 10,000 p.s.i.g. and recovering hydroconversion products from the effluent from said second elongated reaction zone.

12. The process of claim 11 in which the turbulence level in each of said elongated reaction zones is between about 50 and 1,000.

13. A process for the hydroconversion of a hydrocarbon liquid containing at least about 1% Conradson carbon which comprises passing said hydrocarbon liquid under conditions of highly turbulent flow through a first elongated reaction zone at a temperature between about 800° F. and 1100° F., a pressure between about 1,000 and 10,000 p.s.i.g. and in the presence of between about 2,000 and 20,000 cubic feet of hydrogen per barrel of feed, separating the effluent from said first reaction zone into a gaseous portion comprising hydrogen and vaporous hydrocarbons and a liquid portion comprising unvaporized hydrocarbons, countercurrently contacting said liquid portion with hydrogen at a rate of between 5,000 and 20,000 cubic feet of hydrogen per barrel of liquid feed to said first reaction zone, recovering unreacted hydrogen and hydrocarbon vapors produced in the contacting zone, combining said unreacted hydrogen and produced hydrocarbon vapors with said gaseous portion, contacting the combined stream with a hydrogenation catalyst at a temperature between about 600° F. and 950° F. a space velocity between about 0.5 and 5 liquid volumes of feed per hour per volume of catalyst, passing at least a portion of the hydrocarbon effluent from the catalytic zone in the presence of hydrogen under conditions of highly turbulent flow through a second elongated reaction zone at a temperature between about 900° F. and 1200° F. and a pressure between about 1,000 and 10,000 p.s.i.g. and recovering hydroconversion products from the effluent from said second elongated reaction zone.

14. The process of claim 13 in which the turbulence level in each elongated reaction zone is between 50 and 1,000.

15. A process for the hydroconversion of a crude oil which comprises separating said oil into a light fraction boiling below about 600° F. and a heavy fraction boiling above about 600° F., passing said heavy fraction under conditions of highly turbulent flow through a first elongated reaction zone at a temperature between about 800 and 1100° F. and a pressure of at least 500 p.s.i.g. in the presence of added hydrogen, passing at least a portion of the effluent from said first reaction zone into contact with a hydrogenation catalyst under hydrogenation conditions including a temperature between about 600° F. and 900° F. and a pressure between about 500 and 2000 p.s.i.g. and at a space velocity between 0.1 and 10 liquid volumes of hydrocarbon per hour per volume of catalyst, combining said light fraction with the effluent from the catalytic zone and passing the mixture including hydrogen under conditions of highly turbulent flow through a second elongated reaction zone at a temperature between 800 and 1500° F. and a pressure of at least 500 p.s.i.g. and recovering the products of hydroconversion from the effluent from said second elongated reaction zone.

16. A process for the hydroconversion of a crude oil which comprises separating said oil into a light fraction boiling below about 600° F. and a heavy fraction boiling above about 600° F., passing said heavy fraction under conditions of highly turbulent flow through a first elongated reaction zone at a temperature between about 800° F. and 1100° F. and a pressure of at least 500 p.s.i.g. in the presence of added hydrogen, combining said light fraction with at least a portion of the effluent from said first reaction zone, passing the resulting mixture including hydrogen into contact with a hydrogenation catalyst at a temperature between about 600° F. and 900° F. and a pressure between about 500 and 2000 p.s.i.g. and at a space velocity between 0.1 and 10 liquid volumes of hydrocarbon per volume of catalyst per hour, passing at least a portion of the hydrocarbon effluent from the catalytic zone in the presence of hydrogen under conditions of highly turbulent flow through a second elongated reaction zone at a temperature between about 800 and 1500° F. and a pressure of at least 500 p.s.i.g. and recovering the products of hydroconversion from the effluent from said second elongated reaction zone.

17. The process of claim 16 in which the effluent from the first reaction zone is separated into a gaseous portion and a liquid portion, the liquid portion is countercurrently contacted with a stream of hot hydrogen to form a residual liquid and a mixture of hydrogen and vaporous hydrocarbons and said mixture of hydrogen and vaporous hydrocarbons is combined with said gaseous portion.

References Cited in the file of this patent

UNITED STATES PATENTS

| 2,349,045 | Layng et al. | May 16, 1944 |
| 2,706,705 | Oettinger et al. | Apr. 19, 1955 |
| 2,989,460 | Eastman et al. | June 20, 1961 |
| 3,089,843 | Du Bois Eastman et al. | May 2, 1963 |